(No Model.) 4 Sheets—Sheet 1.
E. L. SLOCUM.
ELECTRIC LIGHTING SYSTEM.

No. 555,057. Patented Feb. 18, 1896.

Witnesses:
Harry J. Garceau.
James W. Brown.

Inventor:
Eason L. Slocum
S. Scholfield
Atty.

(No Model.) 4 Sheets—Sheet 2.

E. L. SLOCUM.
ELECTRIC LIGHTING SYSTEM.

No. 555,057. Patented Feb. 18, 1896.

Witnesses:
Harry J. Garceau.
James W. Brennan

Inventor:
Eason L. Slocum
By S. Scholfield
Atty.

ANDREW B.GRAHAM. PHOTO-LITHO. WASHINGTON.D.C.

(No Model.) 4 Sheets—Sheet 3.

E. L. SLOCUM.
ELECTRIC LIGHTING SYSTEM.

No. 555,057. Patented Feb. 18, 1896.

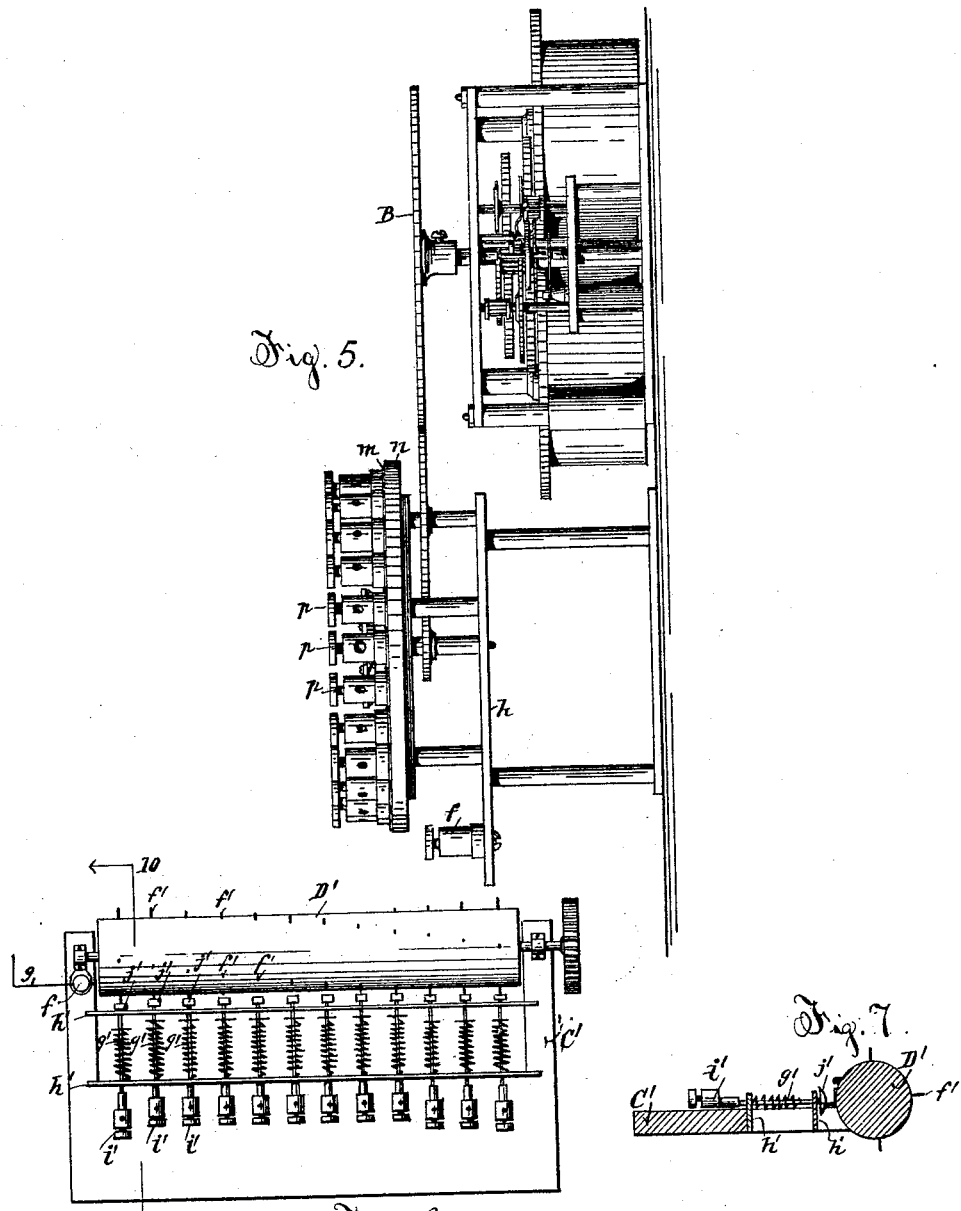

UNITED STATES PATENT OFFICE.

EASON L. SLOCUM, OF PAWTUCKET, RHODE ISLAND.

ELECTRIC-LIGHTING SYSTEM.

SPECIFICATION forming part of Letters Patent No. 555,057, dated February 18, 1896.

Application filed April 3, 1893. Renewed February 13, 1895. Serial No. 538,286. (No model.)

*To all whom it may concern:*

Be it known that I, EASON L. SLOCUM, a citizen of the United States, and a resident of Pawtucket, in the county of Providence and State of Rhode Island, have invented a new and useful Improvement in Systems for Incandescent Electric Lighting, of which the following is a specification.

In incandescent electric lighting, by means of a series of independent electric batteries, it is necessary to use the several independent batteries of the series successively, with proper intervals of activity and rest, in order that the proper uniform energy of the electric current may be maintained throughout the lamp-circuit; and it is the object of my invention to provide suitable means for effecting the successive engagement and disengagement of the several batteries without causing the lamps to flash or vary in their intensity of action at the instant of the disengagement of one of the batteries supplying the lamp - circuit, and the immediate connection of a recuperated battery in its stead; and my invention consists in the employment of an automatically-operated mechanism provided with a plurality of electric contact-points for closing and breaking the electric circuit, whereby the electric currents from a plurality of the said batteries will be conducted through the lamp-circuit simultaneously, and the several separate batteries of the series will be successively brought into action, so that each battery will have a period of action conjointly with one or more of the other batteries and a succeeding interval of recuperative rest.

Figure 1:
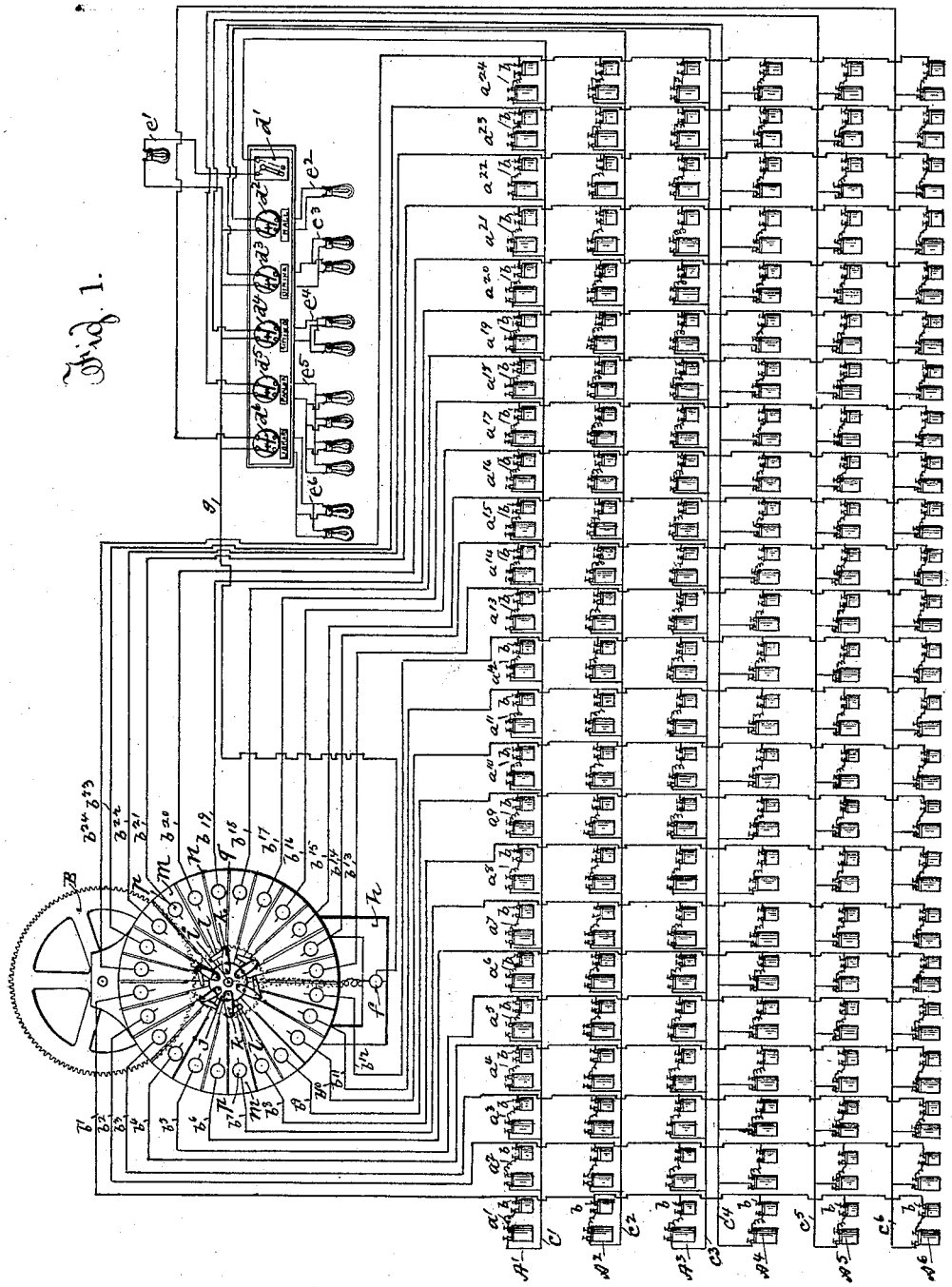
Figure 2:
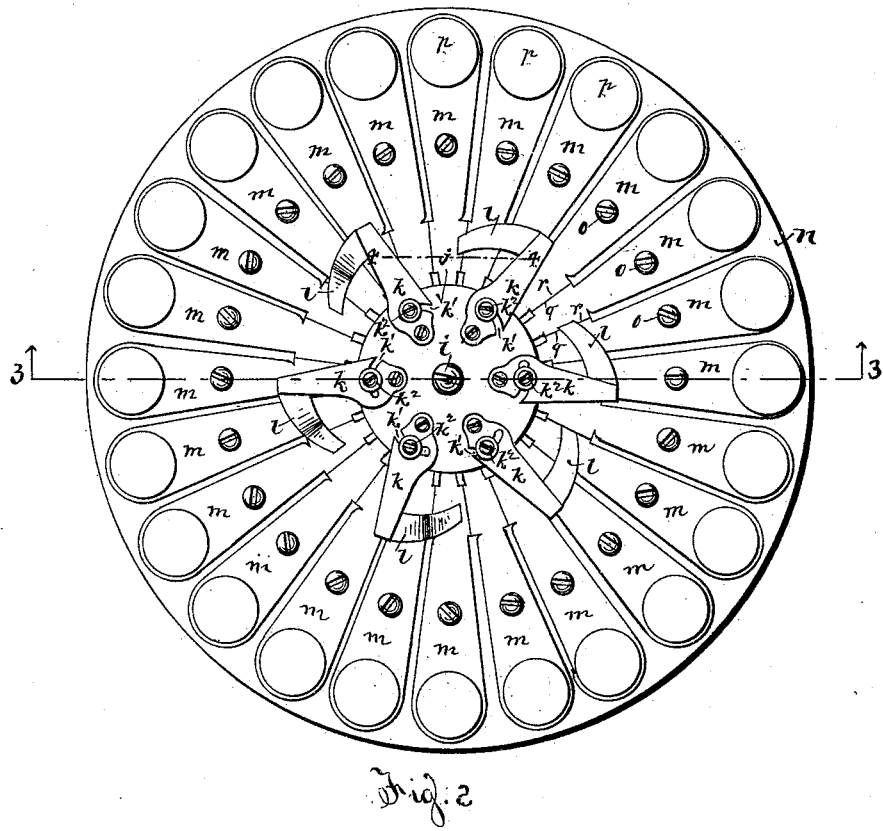
Figure 3:
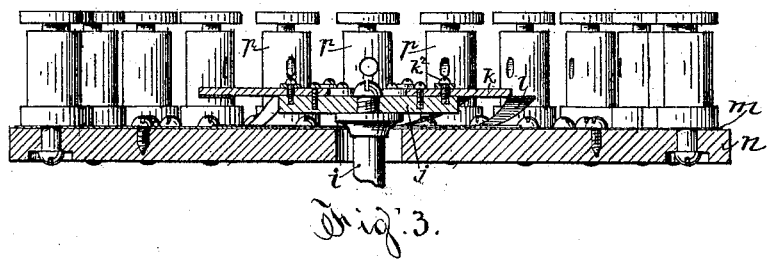
Figure 4:
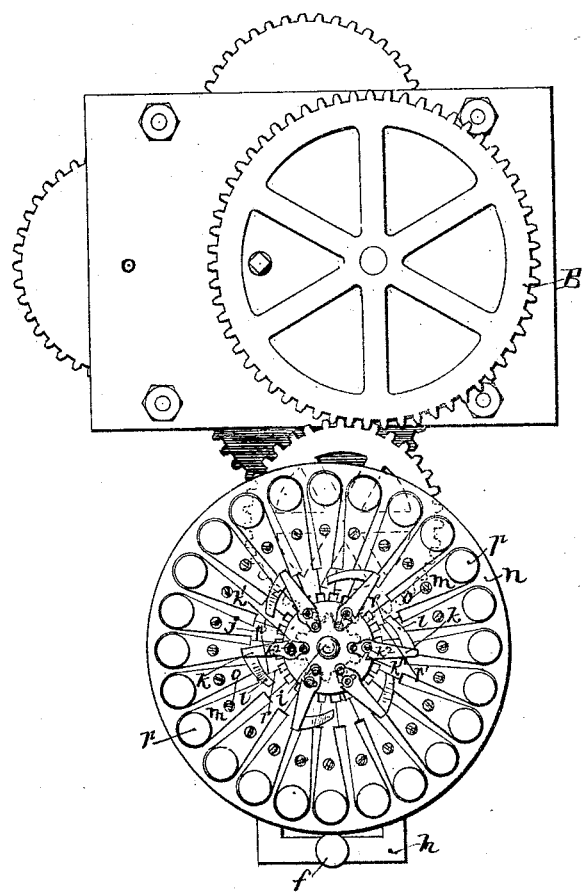

Figure 1 represents the several series of independent electric batteries, the separate lamp-circuits, the hand-switches for connecting and disconnecting the lamp-circuits, and the automatic mechanism for alternately connecting and disconnecting the electric batteries. Fig. 2 represents an enlarged front view of a portion of the mechanism for connecting and disconnecting the electric batteries. Fig. 3 represents a section taken in the line 3 3 of Fig. 2. Fig. 4 represents a face view of the automatic mechanism for alternately connecting and disconnecting the electric batteries. Fig. 5 represents a side view of the same. Fig. 6 represents a top view of a modification in the mechanism for alternately connecting and disconnecting the electric batteries. Fig. 7 represents a section taken in the line 10 10.

In the drawings, Fig. 1, $b'$ to $b^{24}$ represent separate electric-circuit wires connected with the negative electrodes $b\ b$ of the galvanic batteries $a'$ to $a^{24}$ in each of the horizontal sets of batteries $A'\ A^2\ A^3\ A^4\ A^5\ A^6$, the said galvanic batteries being preferably composed of a plurality of cells of different sizes, so that a cell containing enlarged electrodes may stand at the positive pole of each battery to increase the ampèrage of the currents, batteries of two cells, one of small and one of larger size, being shown in the drawings.

The positive poles of the several batteries are connected to the circuit-wires $c'\ c^2\ c^3\ c^4\ c^5\ c^6$, passing, respectively, to the switches $d'$, $d^2$, $d^3$, $d^4$, $d^5$, and $d^6$, which serve to direct the current through the several lamp-circuits $e'$, $e^2$, $e^3$, $e^4$, $e^5$, and $e^6$, as desired, the electric connection between the several lamp-circuits and the binding-post $f$ of the metallic frame $h$ being made by the single electric wire $g$, the metallic frame $h$ forming an electric connection with the shaft $i$, which may be operated by means of the spring-actuated clockwork mechanism B or other suitable source of mechanical movement.

To the outer end of the shaft $i$ is secured the metallic disk $j$, to the outer side of which are pivoted the arms $k\ k$, the said arms being made adjustable by means of the slots $k'\ k'$ and the tightening-screws $k^2\ k^2$, and to the outer ends of the arms $k\ k$ are secured the flat springs $l\ l$, which serve to form a moving electric connection with the insulated plates $m\ m$, which are secured to the hard-rubber disk $n$ by means of the screws $o\ o$, the said insulated plates $m\ m$ being each provided with a binding-post $p$, from which separate connection is made to the negative poles of the several batteries in the series of batteries $A'$, $A^2$, $A^3$, $A^4$, $A^5$, and $A^6$ by means of the said circuit-wires $b'$ to $b^{24}$, no connection being made with the positive electrodes of the batteries.

The electric contact-springs $l\ l$ are so arranged relatively to the electric contact-plates $m\ m$ as to break joints with the said plates, so that but one of the said contact-springs will be caused to cross the space $q$ between the insulated plates $m$ at a time, each of the remaining contact-springs continuing in full electric contact with a contact-plate while the transfer of the electric current is thus being made from one of the said contact-plates to to the other; and by this means but a single battery will be brought into engagement in the lamp-circuit or be disengaged therefrom at a time, so that the alternate engagement and disengagement of the several batteries in the lamp-circuit will not serve to cause the flashing of the lamps. Upon turning the switch $d'$, while the electric contact-springs $l\,l$ are being progressively moved over the contact-plates $m\,m$ by means of the spring-motor B, the horizontal line of the batteries A' will be thrown into electric connection with the lamp-circuit $e'$ and the several batteries of the series A' will be alternately connected and disconnected from the circuit, a number of the said batteries equal to the number of spring-contact points being constantly engaged in the circuit, while the remaining disengaged batteries will be successively re-engaged after an interval of recuperative rest, and, as shown in the drawings, with six moving contact-springs and twenty-four contact-plates, each battery of the series will be in electric engagement with the lamp-circuit one-quarter of the time, with a recuperative rest of three-quarters. By turning the switch $d^2$ the horizontal line of batteries $A^2$ will be thrown into electric connection with the lamp-circuit $e^2$, and the several batteries of the series $A^2$ will be alternately connected and disconnected from the circuit by means of the moving contact-springs $l\,l$, and the similar turning of the switches $d^3$, $d^4$, $d^5$, and $d^6$ will cause the passage of the electric current through the lamp-circuits $e^3$, $e^4$, $e^5$, and $e^6$, and the alternate connection and disconnection of the several batteries will serve to provide a steady and uniform light in the lamps.

In the modification shown in Figs. 9 and 10 the revolving cylinder D' is placed upon the frame C', made of insulating material, and electric connection is made from the lamp-circuits by means of the electric wire $g$ at the binding-post $f$, the cylinder D' being provided at its periphery with the electric contact-pins $f'\,f'$, which are adapted to engage with the spring-actuated cam-faced rods $g'\,g'$, which are insulated from each other and adapted to slide in the bearing-plate $h'\,h'$, and are provided at their outer ends with the binding-posts $i'\,i'$, from which electric connection is to be made to the negative poles of the several batteries of the series. The electric contact-pins $f'\,f'$ are so arranged upon the surface of the cylinder D' that the electric cams $j'\,j'$ will be successively engaged by the contact-pins and disengaged therefrom, whereby the batteries in the lamp-circuit will be successively engaged and disengaged one at a time, as before described.

I claim as my invention—

1. The combination of a series of electric batteries arranged for connection with a lamp-circuit, and separate electric connections with the negative pole of each of the batteries, of the series, which connections do not extend to the positive electrodes of the batteries, with an automatic commutator, adapted to distribute the electric current through the said separate connections to a plurality of the said batteries, and to effect the disengagement of one of the plurality of engaged batteries, for recuperative rest, and the engagement of a recuperated battery in its stead, substantially as described.

2. The combination of a series of electric batteries arranged for connection with a lamp-circuit, and separate electrical connections with the negative pole of each of the several batteries of the series, which connections do not extend to the positive electrodes of the batteries, with an automatic commutator having a plurality of moving electric contact-points, so arranged, that while one of the moving contact-points is in the act of crossing the break between the electric connections, the others are in full electric contact with the separate electric connections, whereby the return electric current will be distributed successively through the said connections, to a plurality of the batteries, so that each of the several batteries in the series will have an interval of action in conjunction with other batteries in the lamp-circuit, and a longer interval of recuperative rest, substantially as described.

3. The combination of electric batteries arranged for connection with a lamp-circuit, and separate electrical connections with the negative pole of each of the several batteries, which connections do not extend to the positive electrodes of the batteries, with an automatic commutator adapted to distribute the electric current through the said separate connections to a plurality of the said batteries, and to effect the disengagement of one of the plurality of engaged batteries for recuperative rest, and the engagement of a recuperated battery in its stead, and the hand-switch for directing the electric current to the lamps, substantially as described.

EASON L. SLOCUM.

Witnesses:
S. SCHOLFIELD,
JAMES W. BEAMAN.